United States Patent [19]

Spillman et al.

[11] Patent Number: 4,963,729

[45] Date of Patent: Oct. 16, 1990

[54] OPTICALLY POWERED SENSOR SYSTEM WITH IMPROVED SIGNAL CONDITIONING

[75] Inventors: William B. Spillman, Charlotte; Richard P. Andresen, Shelburne, both of Vt.

[73] Assignee: Simmonds Precision Products, Inc., Wilmington, Del.

[21] Appl. No.: 318,636

[22] Filed: Mar. 3, 1989

[51] Int. Cl.⁵ ............................................. H01J 5/16
[52] U.S. Cl. .............................. 250/227.21; 250/551; 455/612
[58] Field of Search ................... 250/227, 551, 231 R; 455/612

[56] References Cited

U.S. PATENT DOCUMENTS 4,820,916 4/1989 Patriquin .............................. 250/227
4,857,727 8/1989 Lenz et al. ........................... 455/612

Primary Examiner—David C. Nelms
Assistant Examiner—Khaled Shani
Attorney, Agent, or Firm—Dale R. Lovercheck; Wallace G. Walter

[57] ABSTRACT

An optically powered sensor system with improved signal conditioning includes a plurality of sensors connected to a system optical bus that communicates with a system controller. Optical energy is transmitted along the bus for distribution to all sensor in the system with return pulses from the various sensors transmitted on the bus to the system controller. Each sensor includes a photodiode array for converting optical energy transmitted system-wide by the controller into electrical energy for storage in a storage capacitor associated with each sensor. A capacitance probe transducer and a fixed-value reference capacitor are connected to a resettable integrating pulse encoder that produces a series of short-duration pulses having a pulse spacing that is dependent upon the fixed value of the reference and the parameter-affected value of the transducer. The pulses are used to drive an optical source for transmitting optical pulses from the sensor to the system controller.

25 Claims, 5 Drawing Sheets

FIG. I

OPTICALLY POWERED SENSOR SYSTEM WITH IMPROVED SIGNAL CONDITIONING

CROSS REFERENCE TO RELATED APPLICATIONS

The subject matter of the present application is related to that disclosed in co-pending and commonly assigned U.S. patent application Ser. No. 07/046,075, filed May 5, 1987 by D. Patriquin and entitled "Optically Powered Sensor System," the disclosure of which is incorporated herein by reference.

BACKGROUND OF THE INVENTION

The present invention relates to an optically powered sensor system for sensing physical parameters, and, more particularly, to optically powered sensors and sensing systems in which optical energy from a source is provided to one or more sensors which, in turn, provide information-bearing optical energy representative of the sensed parameter.

Various types of sensors and sensor systems are known for measuring physical parameters. Traditionally, electrical sensors which provide a variation in resistance, capacitance, or other electrical characteristics as a function of a sensed physical parameter have been used to provide an electrical current or voltage output. For example, the resistance of a thermistor varies as a function of its temperature and can be used in a simple bridge circuit to provide a temperature responsive output current. In a similar manner, capacitors and capacitor-like structures can be used to provide electrical signal outputs that are responsive to environmental parameters that affect the dielectric constant of the capacitor. In a system or network context, groups of sensors are typically interconnected with a controller which provides source electrical power to the various sensors and measures or otherwise senses the parameter-affected electrical characteristic. In general, electrical sensors and electrical interconnections represent highly developed and reliable technology, although unshielded systems can be subject to electromagnetic interference (EMI).

With the advent of optical fibers, sensor systems using optical fibers to transmit information from one node in a network to another have been developed or proposed. Optical fiber transmission is best suited to digitally encoded optical pulses in which the information to be conveyed is encoded by varying an attribute of the pulse, such as the pulse width, amplitude, or repetition rate. Systems that transmit analog light signals through optical fibers are less than optimal because of the substantial variation in attenuation for the transmitted energy as a consequence of the fiber temperature, external pressure applied to the fiber, the presence of small-radius bends in the fiber, and the cumulative effects of defects in the fiber.

In view of the highly developed state of traditional electrical sensors and the advantages attendant to pulse transmission in optical fibers, an optimal system can be achieved using traditional electrical sensors with optical fiber interconnection. In general, however, the need to power the electrical sensors requires separate electrical power paths to the sensors and thus adds undesired complexity to the overall system.

In one optical sensor system, as disclosed in U.S. Pat. No. 4,346,478 to Sichling, optical energy is transmitted via optical fibers to a sensor which includes a photodetector and a storage capacitor for converting the input optical energy to electricity for storage in the capacitor. A transducer, such as a temperature sensor, uses the stored electrical energy to provide an electrical output to a pulse width modulator, such as a light emitting diode or a laser diode, to transmit one or more return pulses indicative of the measured parameter. While the Sichling system operates to provide duration-modulated pulses, the overall accuracy of the measurement is a function of the stored energy, and the accuracy can degrade with changing characteristics of the storage capacitor, as can occur, for example, with changes in temperature and component aging. In addition, the use of pulse width modulation requires that the light emitting diode or laser diode be powered during the transmission of the entire pulse. In the context of low-power systems, the optical energy emitter can consume the major portion of the available stored energy and represent a constraint to efficient operation. In the system disclosed in co-pending and commonly assigned U.S. patent application Ser. No. 07/046,075, filed May 5, 1987 by D. Patriquin and entitled "Optically Powered Sensor System," the information is provided using short-duration optical spikes which consume less power for the volume of information transferred. Additionally, at least one spike of the transmitted spikes is representative of a fixed-value reference so that each information-bearing spike can be evaluated in relationship to its associated reference spike to provide improved overall accuracy.

SUMMARY OF THE INVENTION

In view of the above, it is an object of the present invention, among others, to provide an optically powered sensor system with improved signal conditioning in which optical energy is stored as electrical energy for use in sensing a measurable parameter.

It is another object of the present invention to provide an optically powered sensor system with improved signal conditioning in which optical energy is stored as electrical energy for use in sensing a measurable parameter and in which an optical signal is generated as a function of the measured parameter.

It is still another object of the present invention to provide an optically powered sensor system with improved signal conditioning in which optical energy is stored as electrical energy for use in sensing a measurable parameter and in which an optical signal is generated as a function of the measured parameter and as a function of a reference value.

It is a further object of the present invention to provide an optically powered sensor system with improved signal conditioning as a function of an integrated value of a measured parameter and a reference value.

In view of these objects, and others, the present invention provides an optically powered sensor system with improved signal conditioning for measuring various parameters and providing an optical signal representative of the measured parameter. The optically powered system includes at least one sensor having a power converter for converting optical energy to electrical energy for storage in an electrical storage device, such as a capacitor, associated with the sensor. A transducer, such as a capacitor or thermistor having a characteristic that varies as a function of the sensed parameter, and a reference unit, such as a fixed-value capacitor or resistor, is associated with each sensor. The transducer and the reference control an integrator in a pulse encoder to provide output electrical pulses that are a function of the fixed-value reference and the parameter-affected measured value. The pulse output, in turn, drives an optical energy source to provide optical pulses having an attribute representative of the fixed-value reference and the parameter-affected value of the transducer.

In a preferred embodiment, an optically powered sensor system includes a plurality of sensors connected to a system optical bus that communicates with a microprocessor controlled system controller. The system controller transmits optical energy along the bus for system-wide distribution to all sensors in the system and receives return pulses from the various sensors, the return pulses including information as to the measured parameter sensed by the sensor and to a sensor-specific reference value. Each sensor includes a photodiode array for converting optical energy transmitted system-wide by the controller into electrical energy for storage in a capacitor associated with each sensor. A transducer in the form of a capacitance probe and a fixed-value reference capacitor are connected to an integrator within the pulse encoder. In response to power switched from the storage capacitor and under the control of a timing and sequence controller, the integrator provides a recurring sequence of ramp outputs with a first ramp output varying as a function of the capacitance of the capacitance probe in response to the measured parameter and a second ramp output that varies as a function of the combined or cumulative capacitance of the capacitance probe and the fixed-value reference capacitance. Each ramp output is provided to a pair of comparators which trigger respective one-shots at respective lower and upper value limits to provide a pair of time-spaced short-duration pulses that are a function of the parameter-affected capacitance of the capacitance probe and the combined or cumulative capacitance of the capacitance probe and the capacitance of the fixed-value reference. The short-duration pulses are used to drive an optical source for transmitting corresponding short-duration optical pulses from the sensor to the system controller.

In a multi-sensor system, each sensor is provided with sensor-specific time delay prior to the transmission of return pulses from the sensor to the system controller to allow a predetermined 'time window' for each of the sensors to effect transmission to the central controller. The various sensors of the system thus transmit return pulses in a predetermined time-multiplexed sequence.

The present invention advantageously provides an optically powered sensor system with improved signal conditioning in which the value of the measured parameter is obtained as a function of the reference value, and, accordingly, the measurement of the parameter is nearly independent of variations in all other component values in the system. The use of short duration return pulses minimizes the power requirement of the optical energy generator at the sensor and results in substantial efficiency gains for the system.

DESCRIPTION OF THE PREFERRED EMBODIMENT

Figure 1:
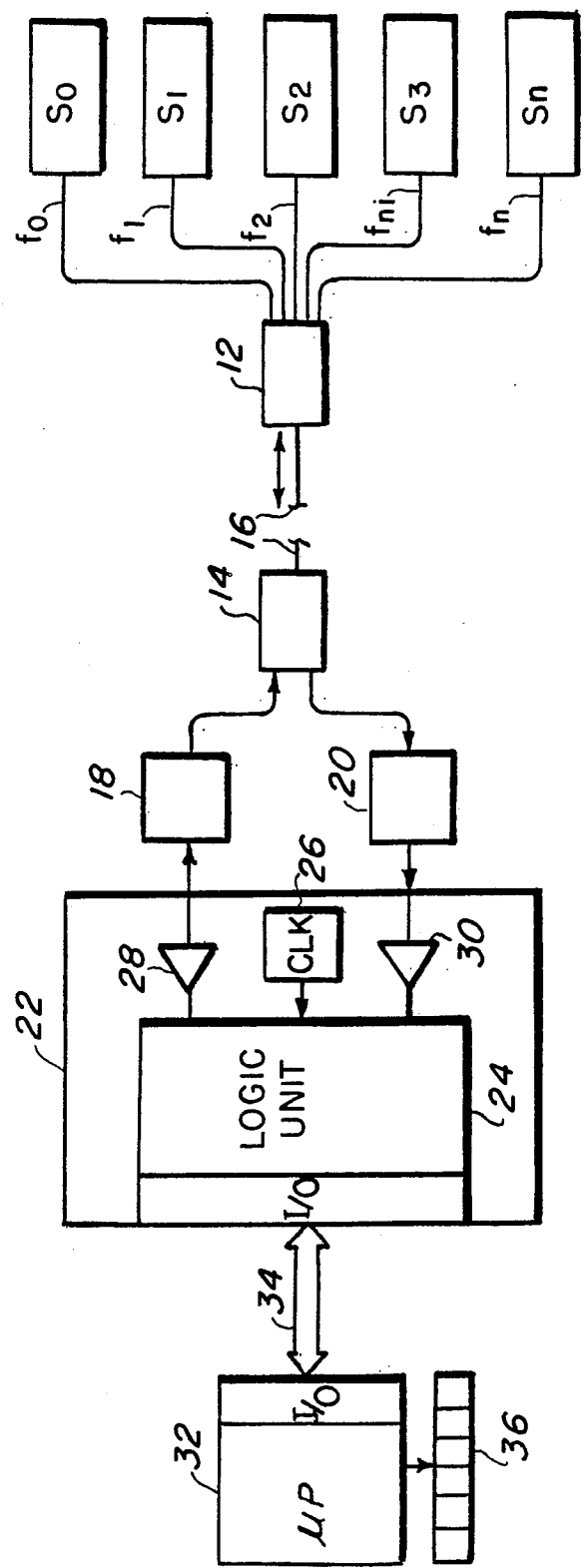
FIG. 1 is an overall schematic diagram of an optical sensor system in accordance with the present invention.

An optically powered sensor system is shown in schematic form in FIG. 1 and is designated generally therein by the reference character 10. As shown, a plurality of sensors $S_0, S_1, \ldots S_{n-1}, S_n$ are connected by respective optical fibers $f_0, f_1, \ldots f_{n-1}, f_n$ to a distribution coupler 12, which, in turn, is connected to another coupler 14 through an optical fiber bus 16. The coupler 14 is designed to distribute optical energy from the bus 16 to the respective sensors $S_n$ and, conversely, direct optical energy from the sensors $S_n$ along the bus 16 to the coupler 14. An optical source 18, such as a laser diode, is connected to the coupler 14 and directs optical energy into the coupler 14 for transmission via the bus 16 to the coupler 12 and system-wide distribution to the various sensors $S_n$. In an analogous manner, an optical energy receiver 20, such as PIN diode, is connected to the coupler 14 and converts optical energy provided from the sensors $S_n$ through the bus 16 into corresponding electrical signals. The couplers 12 and 14 can take the form of star-type couplers or lateral couplings.

A system controller 22 is connected to the optical source 18 and the optical receiver 20 and functions, as described below, to drive the optical source 18 to introduce optical energy into the system and to process the return signals from the optical receiver 20. The controller 22 includes a logic unit 24 that operates through a recurring cycle under the control of a clock 26 to provide current through a drive amplifier 28 to cause the optical source 18 to direct optical energy through the coupler 14 and the bus 16 to the coupler 12 and the various sensors $S_n$.

Additionally, an amplifier 30 accepts pulse signals from the optical receiver 20 for presentation to the logic unit 24. The controller 22 operates under the general control of a micro-processor 32 with communication provided through a bus 34 and respective I/O ports (unnumbered). An output device 36, such as a multi-digit display, is connected to the micro-processor 32 and provides output information as to the parameters sensed by the sensors $S_n$.

Figure 2:
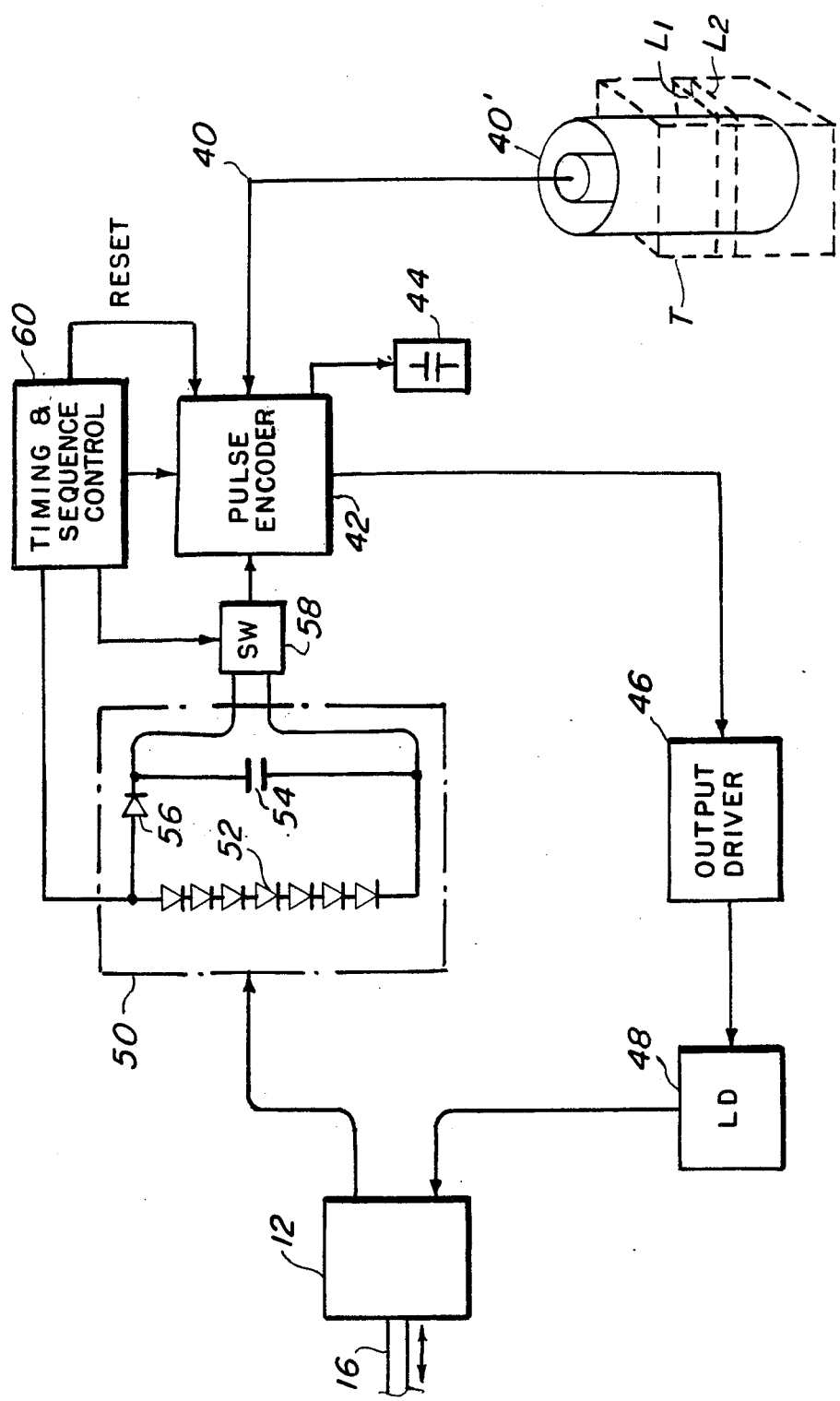
FIG. 2 is a schematic block diagram of an exemplary sensor in accordance with the present invention.

The organization of a sensor $S_n$ is shown in functional block form in FIG. 2. As shown, each sensor $S_n$ includes a transducer 40 that has a characteristic, such as capacitance, which changes in a predictable manner with the sensed parameter. A pulse encoder 42 is connected to the transducer 40 and to a fixed-value reference 44 and provides a pulse output, as described more fully below, to an output driver 46 which, in turn, drives a light emitting diode 48 to provide optical pulses through the coupler 12 and the bus 16.

In the preferred application of the present invention as described below, the transducer 40 takes the form of a capacitance probe 40' used in fuel tank measurement systems in aircraft, and the fixed-value reference 44 takes of the form of a precision fixed-value capacitance. The capacitance probes 40' are typically fabricated from conductive cylindrical sleeves that are concentrically mounted relative each other to define capacitor plates. The probe 40' is positioned within its fuel tank with the dielectric constant between the plates determined by the portion of the probe 40' that is wetted by the fuel, as well as the airspace above the fuel. In FIG. 2, an exemplary fuel tank T is shown in dotted line illustration as containing a liquid which can assume varying levels as represented by levels $L_1$ and $L_2$.

Optical energy provided by the optical energy source 18 through the bus 16 and the coupler 12 is provided to a power converter 50 within each sensor $S_n$ which includes a series-connected array of photodiodes 52 in shunt circuit with a storage capacitor 54 and in series circuit with a diode 56. Optical energy provided through the bus 16 and the coupler 12 is converted to a DC potential by the photodiodes 52 and stored in the shunt-connected capacitor 54. The diode 56 has a low forward voltage drop and serves to isolate the photodiodes 52 from the remainder of the circuitry. A power switch 58 is connected to the power converter 50 and selectively provides power to the pulse encoder 42 under the control of a timing and sequence control circuit 60. The power switch 58 can take the form of a MOSFET or other gate-controlled device.

Figure 3:
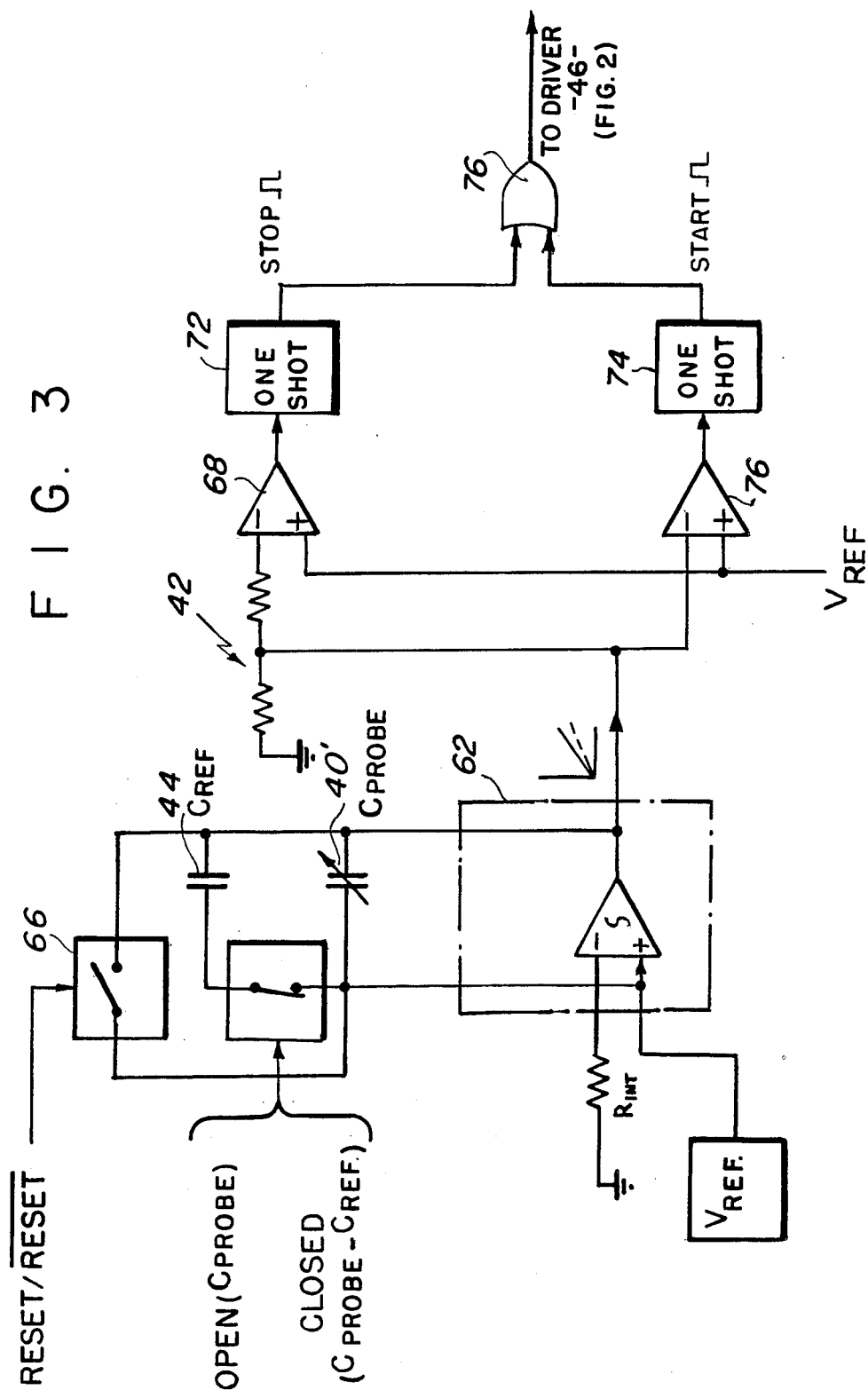
FIG. 3 is a functional block diagram of an integrating pulse encoder for providing pulses having attributes representative of a measured value and a reference value.
Figure 4:
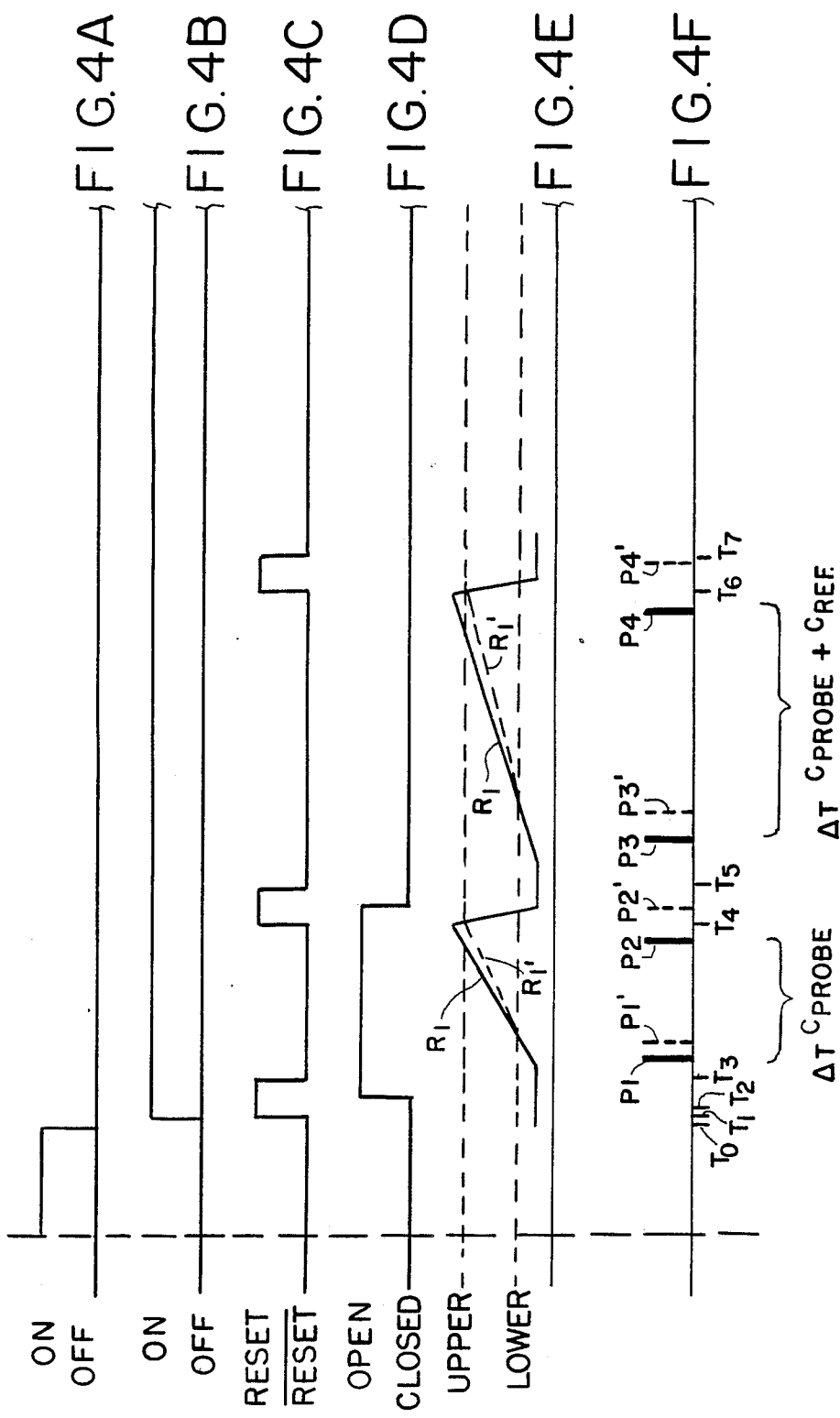
FIGS. 4A to 4F are idealized timing charts graphically illustrating the sequence of operations for the sensor system of FIG. 1.

An integrating pulse encoder or modulator 42 in accordance with the present invention is shown in FIG. 3 and, as shown, includes an integrator 62 that functions to time-integrate a voltage $V_{ref}$ as a function of the capacitance $C_{probe}$ of the capacitance probe 40' and as a function of the parallel-connected capacitance of the capacitance probe 40 and the capacitance of the reference 44, i.e., $C_{probe}+C_{ref}$. The integrator 62 may be defined by an operational amplifier, such as a Harris 5154 op-amp in a Miller integrator or functionally equivalent configuration. The voltage $V_{ref}$ is supplied from the charge in the storage capacitor 54 and is quantitatively controlled by a regulator and/or zener diode circuit (not shown). The capacitance probe 40' is connected in a feedback configuration between the output and the input of the integrator 62. The reference capacitor 44 is selectively connected in parallel with the capacitance probe 40' through a switch 64 that is controlled by the timing and sequence control circuit 60 (FIG. 2). Another switch 66, the 'reset' switch, is connected in shunt circuit with the reference capacitor 44 and the capacitance probe 40' and is selectively operated by the timing and sequence control circuit 60 to periodically reset the integrator 62 by shunting both the capacitance probe 40' and the reference capacitor 44, as explained below in relationship to FIGS. 4 and 5. As in the case of the switch 58 (FIG. 2), the switches 64 and 66 can take the form of a MOSFET or other gate-controlled device.

The integrator 62 provides a recurring ramp output having a rate-of-increase (i.e., slope) that is a function of the capacitance in its feedback loop, as represented in a qualitative graphical manner by the solid and dotted line inclines shown in FIG. 3 at the output of the integrator 62. The ramp output of the integrator 62 is provided to a dual-comparator circuit that includes a first comparator 68 and a second comparator 70 configured to provide respective outputs when the ramp output of the integrator 62 exceeds predetermined lower and upper limits. The comparators 68 and 70 can be configured from high-gain operational amplifiers with the voltage divider defined by the series-connected resistors (unnumbered) connected to the inverting input of the comparator 68 establishing an upper limit that is higher than that of the comparator 70. The output of each comparator 68 and 70 is provided, respectively, to one-shot monostable multivibrators 72 and 74. The one-shots 72 and 74 each provide a short-duration output pulse through an OR gate 76 to the driver 46 (FIG. 2), which, in turn, provides corresponding short-duration optical spikes. As explained below, the integrator 62 provides a sequence of recurring ramp outputs during each measurement cycle (FIGS. 4A-4F) as a function of the capacitance in its feedback path with comparators 70 and 68 triggering their respective one-shots 74 and 72 as the ramp value progressively exceeds the lower and then the upper limits. The interpulse spacing is, accordingly, representative of the parameter-affected capacitance in the feedback path of the integrator 62.

Figure 5:
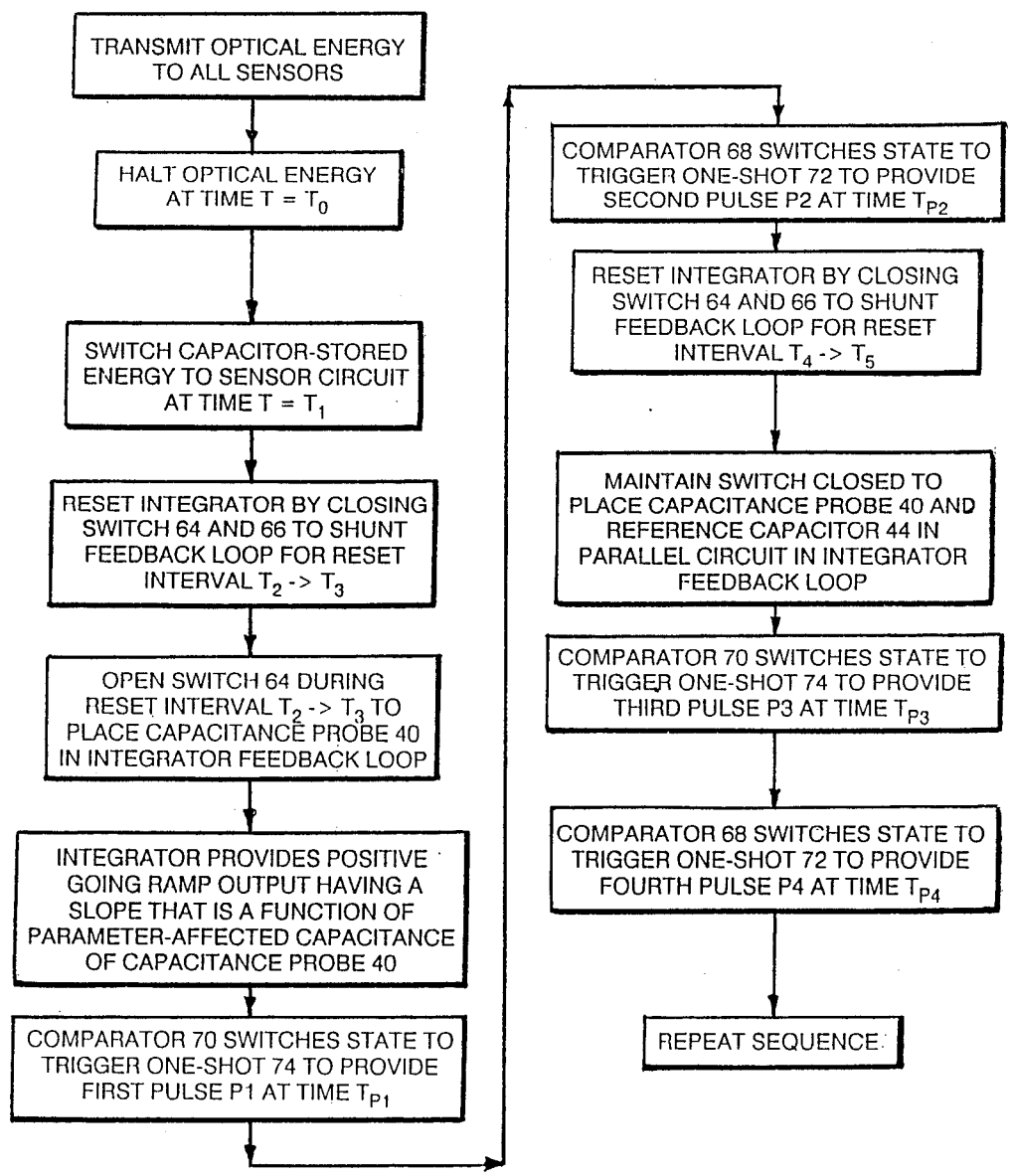
FIG. 5 is a flow diagram of the control sequence for the sensor system to obtain the measured-value and reference-value pulses of FIGS. 4A to 4F.

The optically powered sensor system operates in accordance with the flow diagram of FIG. 5 to sense the measured parameter and provide a pulse sequence, as shown in FIG. 4F, containing information representative of the measured parameter as well as the reference value. As shown in FIG. 5 and as represented in FIG. 4A, the system is initialized by transmitting optical energy from the optical energy source 18 through the bus 16 for distribution to all sensors $S_n$ in the system. The photodiodes 52 of each sensor $S_n$ convert the distributed optical energy to an electric current and charge the storage capacitor 54 of each sensor $S_n$, preferably to a full charge or near full charge condition as determined by the timing and sequence control circuit 60. In general, the optical energy provided from the optical source 18 is of a sufficient duration and intensity to assure a sufficient charge in the capacitor 54 of each sensor $S_n$ for at least one measurement cycle. As shown by the graphical representations of FIGS. 4A and 4B, the distributed optical energy is halted at time $T_O$ by the controller 22 in response to commands provided from the micro-processor 32. The termination of the distributed optical energy is detected by each sensor $S_n$ and the power switch 58 of each sensor $S_n$ is switched at time $T_1$ to apply power to the remaining sensor circuitry (FIG. 4B).

Thereafter, the integrator 62 is reset by closing both the switches 64 and 66 to effectively shunt the feedback path of the integrator 62 for some time period between times $T_2$ and $T_3$, as represented in FIG. 4C. The reset interval forces the output of the integrator 62 to a known initial voltage.

During the reset interval between times $T_2$ and $T_3$, the switch 64 is opened (FIG. 4D) in response to a command from the timing and sequence control circuit 60 to effectively leave only the capacitance probe 40' and its capacitance $C_{probe}$ in the integrator 62 feedback loop. With the conclusion of the reset interval at time $T_3$, the reset switch 66 is opened by the timing and sequence control circuit 60 with the output of the integrator 62 rising in a ramp-like manner as the capacitance in the feedback path is charged. As can be appreciated, the slope of the output ramp is a function of the capacitance in the feedback path, a larger capacitance providing a lower slope as represented by the solid and dotted line ramps $R_1$ and $R_{1'}$ in FIG. 4D. As the ramp $R_1$ value increases, it exceeds the lower limit established by the comparator 70 which changes its output state to trigger the one-shot 74 to produce a first short-duration output pulse P1 at time $T_{P1}$ as shown in FIG. 4F. The ramp $R_1$ value continues to increase at a rate that is a function of the capacitance $C_{probe}$ in its feedback path until the ramp $R_1$ value exceeds the upper limit established by the comparator 68 which then changes its output state to trigger the one-shot 72 to produce a second short-duration output pulse P2 at time $T_{P2}$. The time interval $\delta T$ between time $T_{P1}$ and time $T_{P2}$ is a function of the value of the capacitance $C_{probe}$ of the probe 40', and, in the case of the preferred application, will vary as a function of the level L of the liquid in the tank T (FIG. 2.). For example and as shown by the dotted line ramp $R_{1'}$ in FIG. 4E, a lower-slope ramp will exceed the lower limit established by the comparator 70 to produce a first pulse $P_{1'}$ and a time $T_{P1'}$ (as shown in dotted line illustration), somewhat later than the time $T_{P1}$ in the case of the ramp $R_1$. As the ramp $R_{1'}$ value increases to exceed the upper limit value, the comparator 68 will change its output state to trigger the one-shot 72 to produce the second pulse P2 (dotted line illustration) at time $T_{P2'}$. The time interval $\delta T$ between times $T_{P1}$ and time $T_{P2}$ for the ramp $R_1$ and the time interval between times $T_{P1'}$ and time $T_{P2'}$ for the ramp $R_{1'}$ will differ as a function of the value of the capacitance $C_{probe}$ of the probe 40' which is function of the level L of the liquid in the tank T (FIG. 2.).

At some time after the conclusion of the second pulse P2, the switch 64 is closed (as shown in FIG. 4D) and the reset switch 66 is closed under the control of the timing and sequence control circuit 60 between times $T_4$ and $T_5$ to again reset the integrator 62 by effectively shunting the parallel-connected capacitances $C_{probe}$ and $C_{ref}$. At the conclusion of the reset interval at time $T_5$, the reset switch 66 is opened by the timing and sequence control circuit 60. Since the switch 64 remains closed, the combined capacitances $C_{probe} = C_{ref}$ of the parallel-connected capacitance probe 40' and the reference capacitor 44 are in the integrator 62 feedback path. The output of the integrator 62 rises again in a ramp-like manner, as indicated by the solid-line ramp $R_2$, as the capacitance in the feedback path is charged. Since the parallel-connected capacitance $C_{probe} + C_{ref}$ is greater than that of the capacitance $C_{probe}$, the rate of increase of the ramp $R_2$ occurring after time $T_5$ will be lower than in the case of the ramp $R_1$ occurring after time $T_3$, although the ramp $R_2$ will nonetheless be a function of the parameter-affected value of the capacitance $C_{probe}$. As the ramp $r_2$ value increases, it will exceed the lower limit established by the comparator 70 which changes its output state to trigger the one-shot 74 to produce a third short-duration output pulse P3 at time $T_{p3}$. The ramp $R_2$ value will continue to increase at a rate that is a function of the capacitance $C_{probe} + C_{ref}$ in its feedback path until the ramp $R_2$ value exceeds the upper limit established by the comparator 68 which then changes its output state to trigger the one-shot 72 to produce a fourth short-duration output pulse P4 at time $T_{P4}$. As described above for the ramp $R_{1'}$, a lower-slope ramp $R_{2'}$ (dotted line illustration) will exceed the lower limit established by the comparator 70 to produce the first pulse P3' and a time $T_{P3'}$ (as shown in dotted line illustration), somewhat later than the time $T_{P3}$ in the case of the ramp $R_2$. As the ramp $R_{2'}$ value increases to exceed the upper limit value, the comparator 68 will change its output state to trigger the one-shot 72 to produce the second pulse P4' (dotted line illustration) at time $T_{P4'}$.

At some time after the conclusion of the fourth pulse P4, the integrator 62 is again reset as described above during an interval between times $T_6$ and $T_7$.

As described in the above-incorporated U.S. patent application Ser. No. 07/046,075, filed May 5, 1987, the pulse encoder 42 of each sensor $S_n$ is provided with a sensor-specific time delay; thus a first sensor S1 functions to respond after a 450 microsecond period after time T1, the second sensor S2 functions to respond after a 900 microsecond period after time T1, the third sensor S3 functions to respond during a 1350 microsecond period after time T1, etc. This sensor-specific time delay prior to the transmission of the return pulses from the sensors to the system controller to allow a predetermined 'time window' for each of the sensors $S_n$ to effect transmission to the system controller 22. The various sensors $S_n$ of the system thus transmit return pulses in a predetermined time-multiplexed sequence.

The optical pulses P1, P2, P3, and P4 have a relatively short duration, that is, on the order of two to eight microseconds, and thus constitute optical spikes rather than pulses having an appreciable duration The duration of the electrical pulse output of the one-shots 72 and 74 through the OR gate 76 (FIG. 3) is sufficient to drive the light emitting diode 48 to provide the short-duration optical pulses P1, P2, P3, and P4.

The inclusion of the reference pulse information allows evaluation of the parameter-affected value in the context of a reference that is subjected to the same variables, i.e., the storage capacitor 54 and the related circuitry, so that errors introduced at the sensor $S_n$ by sub-optimal performance of the energy storage function, environmental factors, or aging will be cancelled or effectively minimized.

The optical pulses are returned to the system controller 22 (FIG. 1) from each sensor $S_n$ along the bus 16, and the micro-processor 32 processes the information by determining the time interval between times $T_{P1}$ and time $T_{P2}$ and times $T_{P3}$ and $T_{P4}$ and obtains a ratio of the first time interval relative the second time interval and multiplies this ratio by the known value of the reference capacitor 44 and other system specific scale factors. The value of the measured parameter is thus obtained as a function of the reference value, and, accordingly, the measured value that is representative of the measured parameter is independent of the storage capacitor 54 used in each sensor $S_n$ and is also relatively immune related circuit drift.

While the disclosed embodiment has been presented in the context of positive-going ramps (FIG. 4E), the invention can likewise be implemented with negative-going ramps. Additionally, the relative position of the capacitance probe 40' and the reference capacitor 44 in the feedback path of the integrator 62 (FIG. 3) can be reversed while providing the desired functional result.

The present invention advantageously provides an optically powered sensor system with improved signal conditioning in which the value of the measured parameter is obtained as a function of a reference value, and, accordingly, the measurement of the sensed parameter is independent of the energy storage device used in each sensor and is also relatively immune to component value drift. The use of short-duration optical pulses results in improved energy utilization in contrast to systems which use pulse width modulation.

As will be apparent to those skilled in the art, various changes and modifications may be made to the illustrated optically powered sensor system with improved signal conditioning of the present invention without departing from the spirit and scope of the invention as determined in the appended claims and their legal equivalent.

What is claimed is:

1. An optically powered sensor system comprising:

an optical energy source for transmitting optical energy;

an optical pathway for conveying the optical energy transmitted by said optical energy source;

at least one sensor connected to said optical pathway for receiving optical energy from said optical energy source, said sensor including means for converting optical energy from said optical pathway to electricity and storing the electrical energy, a transducer having a capacitive characteristic that varies as a function of a parameter to be sensed, a reference component having a capacitance value that is independent of the parameter to be measured, circuit means for providing electrical energy from said converting and storing means to said transducer and said reference component for selectively integrating the capacitance values of said transducer and reference component to produce a multi-pulse output having first time attribute that is a function of the capacitance of said transducer and a second time attribute that is a function of the capacitance of said reference component.

2. The optically powered sensor system of claim 1, wherein said circuit means produces at least a first set of two pulses, the interpulse spacing of which is a function of the capacitance of said transducer, and another set of pulses, the interpulse spacing of which is a function of the capacitance said reference component.

3. The optically powered sensor system of claim 1, wherein said circuit means produces at least a first set of two pulses, the interpulse spacing of which is a function of the combined capacitance of said transducer and said reference component, and another set of pulses, the interpulse spacing of which is a function of the capacitance said reference component.

4. The optically powered sensor system of claim 3, wherein the pulses of said first and second sets of pulses are fixed-duration pulses.

5. The optically powered sensor system of claim 1, wherein said circuit means comprises:
an integrator having a feedback path and first switching means for selectively switching said transducer and reference component into said feedback path.

6. The optically powered sensor system of claim 5, wherein said circuit means comprises:
second switching means for selectively shunting said feedback path.

7. The optically powered sensor system of claim 5, wherein said circuit means comprises:
means responsive to first and second values of the output of said integrator to produce pulse outputs at said values.

8. The optically powered sensor system of claim 7, wherein said circuit means comprises:
first and second comparators that switch output states at first and second values of the output of said integrator.

9. The optically powered sensor system of claim 8, wherein said circuit means comprises:
first and second pulse generators coupled, respectively, to said first and second comparators to produce pulse outputs at said first and second values.

10. The optically powered sensor system of claim 5, wherein said circuit means comprises:
timing and control means coupled to said first switching means to selectively (a) switch said transducer and reference component in parallel circuit into said feedback path and (b) switch said transducer into said feedback path.

11. The optically powered sensor system of claim 1, wherein said transducer comprises:
liquid level sensing probe.

12. The optically powered sensor system of claim 1, further comprising:
means for converting the pulse output of said circuit means to an optical pulse output.

13. The optically powered sensor system of claim 1, further comprising:
means for converting the pulse output of said circuit means to an optical pulse output and for introducing the optical pulse output onto said optical pathway.

14. An optically powered sensor comprising:
means for converting optical energy from an optical energy source to electricity and storing the electrical energy, a transducer having a capacitive characteristic that varies as a function of a parameter to be sensed, a reference component having a capacitance value that is independent of the parameter to be measured, circuit means for providing electrical energy from said converting and storing means to said transducer and said reference component for selectively integrating the capacitance values of said transducer and reference component to produce a multi-pulse output having first time attribute that is a function of the capacitance of said transducer and a second time attribute that is a function of the capacitance of said reference component.

15. The optically powered sensor of claim 14, wherein said circuit means produces at least a first set of two pulses, the interpulse spacing of which is a function of the capacitance of said transducer, and another set of pulses, the interpulse spacing of which is a function of the capacitance said reference component.

16. The optically powered sensor of claim 14, wherein said circuit means produces at least a first set of two pulses, the interpulse spacing of which is a function of the combined capacitance of said transducer and said reference component, and another set of pulses, the interpulse spacing of which is a function of the capacitance said reference component.

17. The optically powered sensor of claim 16, wherein the pulses of said first and second sets of pulses are fixed-duration pulses.

18. The optically powered sensor of claim 14, wherein said circuit means comprises:
an integrator having a feedback path and first switching means for selectively switching said transducer and reference component into said feedback path.

19. The optically powered sensor of claim 18, wherein said circuit means comprises:
second switching means for selectively shunting said feedback path.

20. The optically powered sensor of claim 18, wherein said circuit means comprises:
means responsive to first and second values of the output of said integrator to produce pulse outputs at said values.

21. The optically powered sensor of claim 20, wherein said circuit means comprises:
first and second comparators that switch output states at first and second values of the output of said integrator.

22. The optically powered sensor of claim 21, wherein said circuit means comprises:

first and second pulse generators coupled, respectively, to said first and second comparators to produce pulse outputs at said first and second values.

23. The optically powered sensor of claim 18, wherein said circuit means comprises:
   timing and control means coupled to said first switching means to selectively (a) switch said transducer and reference component in parallel circuit into said feedback path and (b) switch said transducer into said feedback path.

24. The optically powered sensor of claim 14, wherein said transducer comprises:
   liquid level sensing probe.

25. The optically powered sensor of claim 14, further comprising:
   means for converting the pulse output of said circuit means to an optical pulse output.

* * * * *